Henry W. Allen
INVENTOR.

March 4, 1969 — H. W. ALLEN — 3,431,424
OPTICAL FLUID SAMPLING DEVICE
Filed Oct. 19, 1965 — Sheet 2 of 3

Henry W. Allen
INVENTOR.

BY *Clarence A. O'Brien*
and *Harvey B. Jacobson*
Attorneys

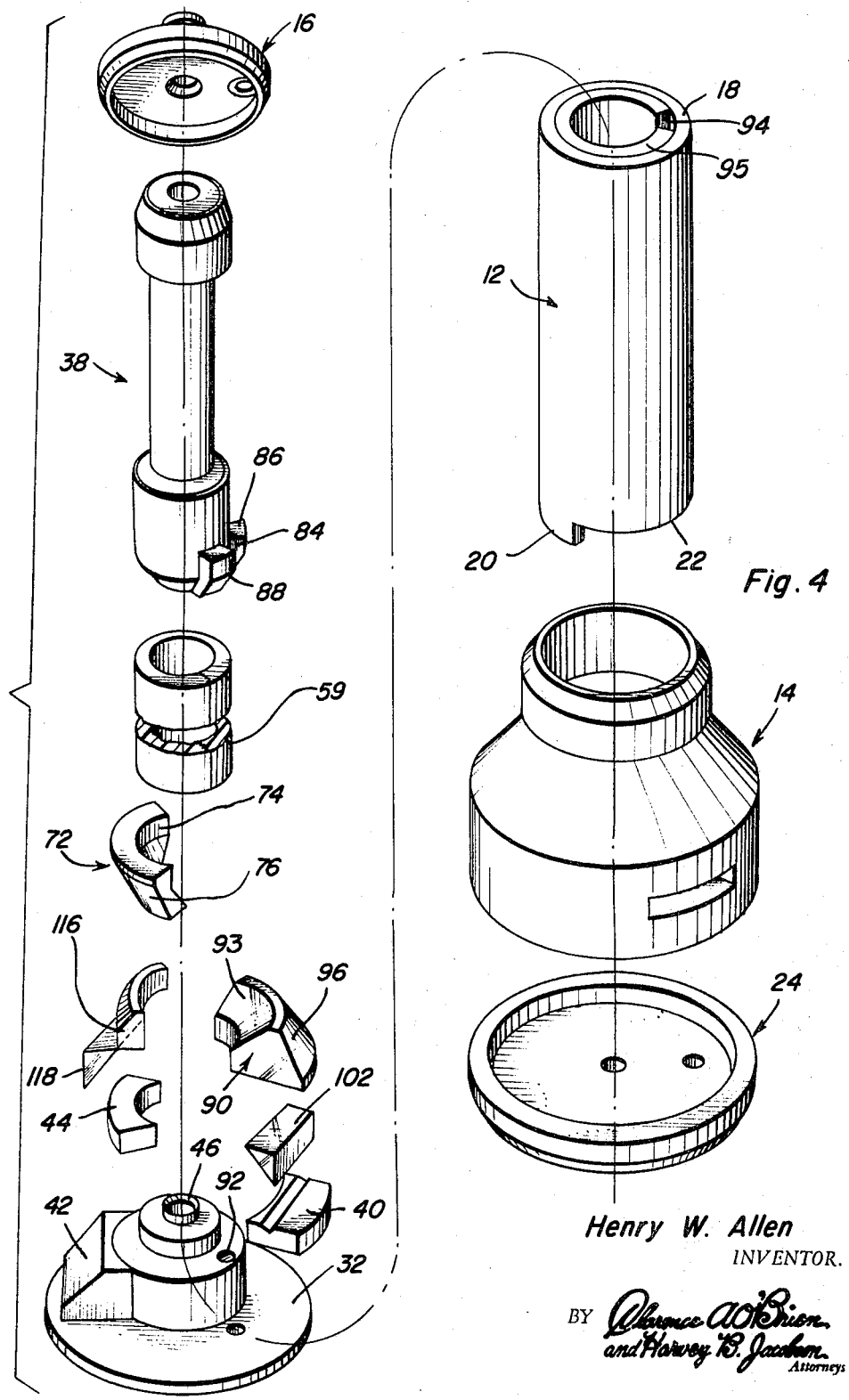

United States Patent Office 3,431,424
Patented Mar. 4, 1969

3,431,424
OPTICAL FLUID SAMPLING DEVICE
Henry W. Allen, 623 W. 5th St.,
Los Angeles, Calif. 90017
Filed Oct. 19, 1965, Ser. No. 497,748
U.S. Cl. 250—218                                11 Claims
Int. Cl. G01n 21/26, 21/00; G01j 3/00

ABSTRACT OF THE DISCLOSURE

A fluid analyzing device or flow cell through which fluid is passed or within which a body of test fluid is received in intersecting relation to a relatively long radiation path as compared to the volume of fluid through which the path extends. The chamber within which the test fluid is disposed is in the form of an elongated axial passage traversed many times by reflected radiation originating from a radiation source with which the flow cell device is associated.

---

This invention relates to the analysis of fluids by techniques involving the absorption of radiation and more particularly to a device through which an optical path is established for radiation through a body of fluid to be analyzed.

The present invention resides in an optical arrangement of parts which may be embodied either in a separate unit or as part of other equipment involving a source of radiation and a radiation detector. The present invention therefore will be useful in connection with a wide variety of scientific and laboratory instruments or equipment employed for the purpose of determining the presence of small amounts of substances within fluids whether they be in a gaseous or liquid state. Instruments such as spectrophotometers and fraction collectors may therefore be improved by use of an arrangement in accordance with the present invention. Other fluid analyzing techniques such as infrared monitoring of gases, column chromatography, preparative disc electrophoresis and gas chromatography will also be enhanced by the optical arrangement of the present invention.

It is therefore a primary object of the present invention to provide an optical system for analyzing a body of fluid by detecting the amount of radiation absorbed therein, wherein an extended radiation absorptive path is established in a novel manner.

A further object of the present invention is to provide an optical arrangement for a fluid analyzing apparatus which may be rapidly and effectively rinsed so as to perform several fluid analyzing tests without being contaminated by traces of substances from previous tests.

A still further object of the present invention is to provide an optical arrangement for fluid analyzing equipment capable of accommodating variations in the wavelength of radiation being utilized and variations in the refractive index associated with the test fluids being sampled.

Yet another object of the present invention is to provide an optical arrangement for fluid analyzing apparatus, wherein the optical arrangement is embodied in a flow cell unit capable of being utilized in different installations and under different test modes.

The test cell unit in accordance with the present invention includes a tubular member made of material transmitting radiation of particular wavelengths. The tubular member is externally coated with a reflective material so as to establish an extended, reflective radiation path between conical end portions traversing an axial passage through which a test fluid is conducted. Radiation directed by an adjustable optical prism arrangement enters the tubular member after passing through a compensating passage adjacent one of the conical ends of the tubular member. The radiation beam following the extended optical path through the tubular member, passes through the test fluid many times in succession before emerging from the conical end of the tubular member and passing through a refractive prism arrangement to a radiation detector.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of the disassembled parts which form the flow cell unit of the present invention.

Figure 1:
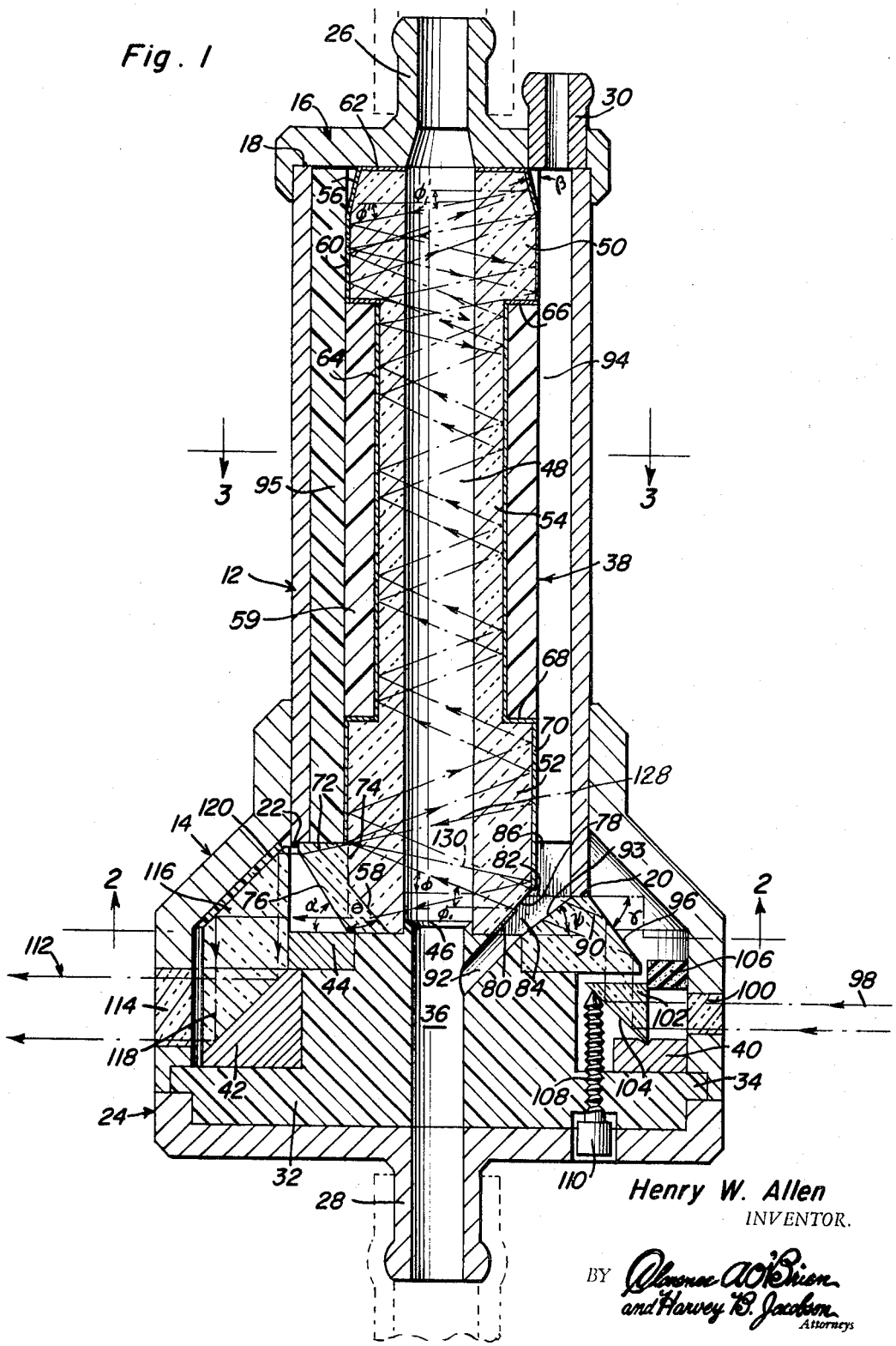
FIGURE 1 is a longitudinal sectional view through a flow cell device constructed in accordance with the principles of the present invention.

Referring now to the drawings in detail, it will be observed from FIGURES 1 and 4, that the arrangement of the present invention may take the form of a flow cell unit generally referred to by reference numeral 10 housed within an axially elongated cylindrical or tubular member 12 cemented to a diametrically enlarged body section 14 adjacent one axial end and a cap member 16 at the other axial end. The outer parts 12, 14 and 16 may be made of of durable, inert plastic such as nylon or Teflon. The upper axial end 18 of the tubular member 12 is closed by the cap 16 while the lower axial end of the tubular member is formed by axially spaced sections 20 and 22 disposed within the outer body section 14. The lower open end of the body section 14 is closed by a lower cap member 24 formed of the same material and cemented to the body section. Projecting axially from the cap members 16 and 24 are axially aligned hose connectors 26 and 28 through which fluid is either caused to pass through the cell unit 10 or supplied to the cell unit. Also mounted by the upper cap member 16 in parallel spaced relation to the hose connector 26, is an auxiliary hose connector 30 serving a purpose to be hereafter explained. The hose connectors 26 and 28 therefore are aligned with the principal, longitudinal axis of the cell unit while the hose connector 30 is disposed in parallel spaced relation thereto. The inner passage 48 surfaces of the hose connectors and a passage within the tubular member 12 are siliconized so as to prevent adhesion and collection of chemical substances thereon.

Seated within the lower cap member 24 is a supporting base 32 which may be made of a rigid plastic such as Lucite or Teflon, the suporting base being provided with an annular flange portion 34 so that it may be clamped between the body section 14 and the lower cap member 24. A central passage chamber 36 is formed within the supporting base in axial alignment with the hose connector 28. The upper end of the passage chamber 36 terminates at an upper end portion 46 which projects into one axial end of an axially elongated tubular assembly 38 enclosed within the cell unit. The supporting base is also shouldered so as to support a pivot block 40 which may be cemented to the supporting base and the body section 14. Also cemented to the supporting base in circumferentially spaced relation to the pivot block 40, is a supporting block 42. An arcuate positioning block 44 is mounted on the supporting base axially spaced above the supporting block 42 and is cemented in place. The upper end portion 46 of the supporting base projects into the axially elongated passage 48 of circular cross-section and constant diameter formed within the tubular assembly 38. The tubular assembly and the passage therein is thereby axially aligned between the passage chamber 36 and the hose connector 26 of the upper cap member 16.

The tubular assembly 38 includes opposite end portions 50 and 52 respectively abutting the upper cap member 16 and the supporting base 32. The end portions 50 and 52 are interconnected by a diametrically smaller intermediate portion 54 to form an integral part made of a material such as fused quartz or synthetic sapphire which transmits radiation of particular wavelengths utilized in accordance with the present invention. The end portions 50 and 52 are also formed with conical surfaces 56 and 58 which converge away from each other toward the longitudinal axis of the cell unit. The angles $\beta$ and $\theta$ respectively formed between the conical surfaces 56 and 58 and the longitudinal axis are selected in accordance with parameters to be hereafter discussed. A sleeve 59 encircles the intermediate portion 54 to complete the tubular assembly.

A reflective layer 60 externally coats the end portion 50 while the axial end thereof abutting the upper cap member 16 is coated by a nonreflecting layer 62. The reflective layer 60 may be in the form of a thin film of metal such as aluminum, silver or gold while the nonreflective layer 62 may be an optical blacking agent to prevent reflection of stray light. The intermediate portion 54 is also coated with a reflective layer 64 while a nonreflective layer 66 coats the shoulder formed between the end portion 50 and the intermediate portion 54. A nonreflective layer 68 made of the same material externally coats the shoulder which interconnects the intermediate portion 54 with the lower end portion 52 so as to prevent reflection of stray radiation. The lower end portion 52 on the other hand is partially coated with a reflective layer 70 leaving exposed however, the conical surface 58 as well as a cylindrical sector thereabove so that an arcuate prism element 72 may be cemented to the lower end portion 52, constituting outlet refraction means. The interface 74 between the prism element 72 and the lower end portion 52 of the tubular assembly is therefore provided with a curvature the center of which lies on the longitudinal axis passing through the central passage 48 so that radiation emerging from the outlet face 76 of the prism element 72 will form a virtual image on the longitudinal axis. The outlet face 76 forms an angle $\alpha$ with an axis perpendicular to the longitudinal axis selected in accordance with parameters to be hereafter discussed. Accordingly, reflected radiation will enter the prism element 72 from the lower end portion 52 of the tubular assembly after traveling along a reflected optical path. Incident radiation will also enter the tubular assembly at the lower end portion 52 in circumferentially spaced relation to the prism element 72 and toward this end, incident radiation is restrictively admitted through an entrance portion 78 defined between the reflective coating 70 and a nonreflective portion 80 which coats a circumferential section of the conical surface 58 of a sufficient length to exceed the width of a beam of incident radiation 82 as shown in FIGURE 1.

Figure 2:
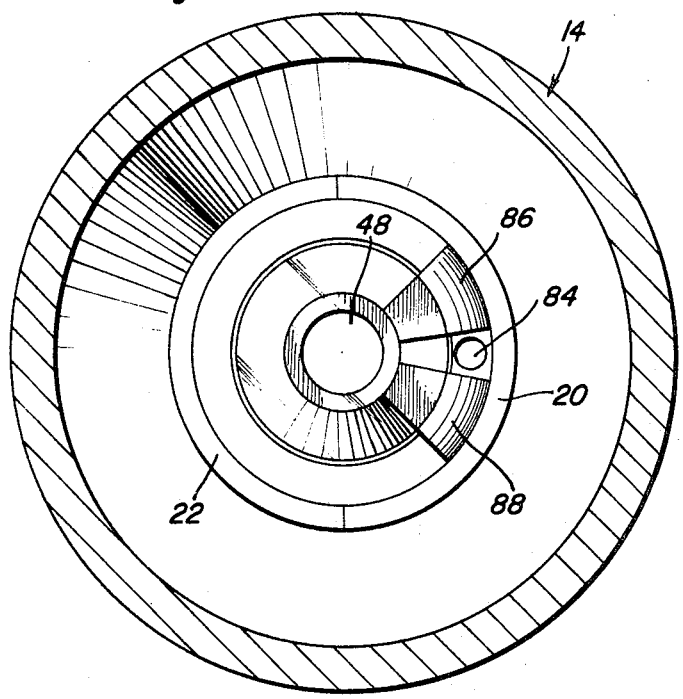
FIGURE 2 is a transverse sectional view taken substantially through a plane indicated by section line 2—2 in FIGURE 1.

The beam of incident radiation 82 enters the entrance portion 78 after traversing a compensating passage 84 formed between a pair of circumferentially spaced blocks 86 and 88 as more clearly seen in FIGURES 2 and 4, the blocks 86 and 88 being cemented to the end portion 52, the lower end of tubular member 12 and an inlet prism element 90 supported on the supporting base 32. The compensating passage 84 is aligned with an upwardly diverging bore 92 formed within the supporting base 32 and intersecting the passage chamber 36. The compensating passage 84 therefore establishes fluid communication between the central passage chamber 36 and a vertically elongated passage 94 formed between the tubular assembly 38 and the outer tubular member 12 by spacer 95 that extends from the upper cap member 16 to the upper abutting surfaces of prism element 72 and blocks 86 and 88. The auxiliary hose connector 30 aforementioned is therefore axially aligned with the passage 94 so that the test fluid within passage 48 will also be disposed within the compensating passage 84 for purposes to be hereafter explained.

The inlet prism element is positioned by the supporting base 32 so that the incident beam of radiation 82 may emerge from its outlet face 93 which forms an angle $\psi$ with an axis perpendicular to the principal or longitudinal axis of the cell unit as shown in FIGURE 1. The prism element 90 is therefore cylindrical in shape so that the curvature of the outlet face 93 has a center which lies on the longitudinal axis. The prism element 90 is fixedly held in position by cementing it to the supporting base and to the axial end section 20 of the tubular member 12 and extends a circumferential distance sufficient to accommodate refraction of the incident beam of radiation. A reflective face 96 is formed on the prism element 90, receiving radiation which originates from the source of radiation with which the cell unit 10 is associated. The source of radiation is therefore arranged to supply a collimated beam 98 which enters the body section 14 through a window 100, the collimated beam 98 having an optical axis perpendicular to the principal longitudinal axis of the cell unit. Accordingly, a noncylindrical prism element 102 is adjustably positioned so as to receive the beam 98 in order to reflect the radiation from its reflective surface 104 into the prism element 90 at right angles to the direction of beam 98. The reflected radiation is reflected from the surface 96 disposed at an angle $\gamma$ selected in accordance with parameters to be hereafter discussed. The noncylindrical prism element 102 is pivotally supported by the block 40 and rests against a foam rubber block 106 constituting a yieldable abutment against which the prism element 102 may be adjusted by means of an adjusting screw 108. The adjusting screw may therefore be provided with a socketed head portion 110 exposed through an opening in the lower cap member 24, preferably sealed in adjusted position. Accordingly, radiation may enter the cell unit in a direction not only perpendicular to the longitudinal axis thereof but in axial alignment with an outlet beam of radiation 112 emerging through a window 114 in the body section 14, the window 114 being located in a position diametrically opposite the window 100.

The reflected radiation which emerges from the lower end portion 52 of the tubular assembly 38 is refracted by the cylindrical prism element 72 so that it may emerge as a beam of radiation, the direction of which is changed by the prism 116 and noncylindrical prism 118 cemented to each other and respectively positioned against the blocks 44 and 42 so as to axially align the outlet beam 112 with the radiation 98 entering the inlet window 100 as hereinbefore indicated. A plastic spacer element 120 also spaces the reflective surface of the prism element 116 from the wall of the body section 14 as shown in FIGURE 1 while the prism element 72 is cemented in position between the supporting base 32 and the lower end section 22 of the tubular member 12 as well as being cemented at its interface 74 by means of a transparent cement. All of the prisms 102, 90, 72, 116 and 118 are made of the same refractive material from which the tubular assembly 38 is made.

The collimated beam of radiation 98 the wavelength of which may be either within the ultraviolet range, the visible light range or the infrared range enters the cell unit through the window 100 as aforementioned and the direction thereof is changed by the noncylindrical prism element 102 so as to be refracted through the prism element 90 emerging therefrom and entering the restricted entrance portion 78 on the conical surface 58 of the lower end portion 52 of the tubular assembly 38. The beam of radiation 82 which enters the lower end portion of the tubular assembly will pass into the material of the lower end portion 52 at an angle $\phi$, and emerge therefrom for passage through the central passage 48 in a plane containing the longitudinal axis thereof at an angle $\phi$ to the axis. The radiation after traversing the passage 48 within the body of test fluid is located, enters the material of the lower end portion 52 once again and is reflected by the reflective coating 70. As will be observed from FIGURE 1, the radiation is successively reflected back and forth through the body of fluid within the passage 48 to progressively travel upwardly into the intermediate portion 54. In view of the smaller diameter of the intermediate portion 54, a greater number of reflections occur per unit length in order to further extend the optical path of the radiation. Finally, the radiation reaches the upper end portion 50 so that when it is reflected by the reflective coating 60 on the conical surface 56, it will begin a return path at an angle $\phi_1^1$ smaller than the entrance angle $\phi_1$ aforementioned and then enter the passage 48 at an angle $\phi^1$ also smaller than the angle $\phi$ at the lower end portion aforementioned. Thus, the reflected radiation will return along another path and finally emerge from the lower end portion along the interface 74 between the lower end portion and the prism element 72 as aforementioned. Knowing the refractive index of the transmissive material from which the tubular assembly 38 is made, the angles $\phi$, $\phi_1$, $\phi^1$, and $\phi_1^1$ may be computed as well as the angles $\beta$ and $\theta$ necessary to cause substantially all of the radiation entering the tubular assembly 38 to travel through the indicated path and emerge altered only by the extent to which the body of test fluid within passage 48 has absorbed certain wavelengths of the radiation. In view of the numerous and successive traversals of the central passage 48 containing the test fluid, a relatively large length-to-volume ratio is obtained so as to provide an accurate analysis of the test fluid by detecting the beam of radiation 112 which emerges from the cell unit by means of a radiation detector.

It will be apparent that all of the radiation descending the tubular assembly 38 will exit through prism 72. Considering an extreme situation, FIGURE 1 shows a return radiation path wherein radiation is reflected along line 128 to a limit point where the prism 72 begins and reflective coating 70 ends. Any radiation just below this limit point will enter prism 72 at an upper end while radiation just above will be reflected along line 130 to be reflected once again before entering the lower portion of the prism 72 as shown in FIGURE 1. Accordingly, radiation will exit through prism 72 between the upper and lower limits indicated regardless of the location of the reflection points and the values of the refraction angles $\phi$, $\phi_1$, $\phi^1$ and $\phi_1^1$.

It will be appreciated, that the locations at which the radiation beams are reflected within the tubular assembly 38 may vary in accordance with the wavelength of the beam of radiation 98 entering the cell unit and in accordance with variations in the refractive index of the test fluid disposed within the passage 48. The value of the angle $\theta$ for the conical surface 58 can therefore only be selected as a compromise for both variations in wavelength and refractive index. In order to compensate for such variations, the test fluid within passage 48 is also disposed within the compensating passage 84 as aforementioned so that the incident beam of radiation 82 passes therethrough. In conjunction with the value of $\theta$ selected in accordance with the aforementioned criteria, the angles $\psi$ and $\gamma$ associated with the prism element 90 are computed in order to provide complete compensation between the extreme values of refractive index and radiation wavelength to be encountered. For example, the wavelength extremes may be those values associated with ultraviolet and infrared radiation while the extreme refractive index values may be those associated with water and quartz. Thus, the flow cell unit of the present invention will not only make possible a highly accurate and sensitive analysis of the test fluid being handled but will be applicable to various installations and test procedures.

Figure 5:
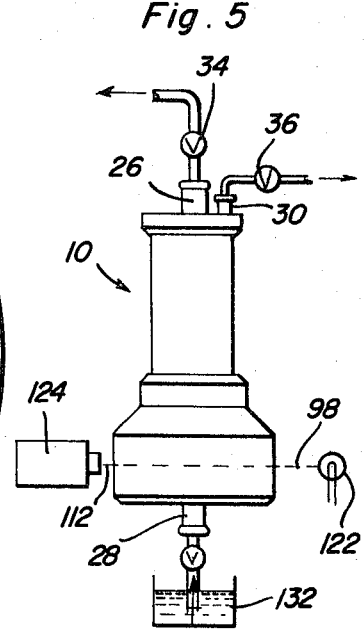
FIGURE 5 is a diagrammatic side elevational view showing the flow cell unit in one operational mode.
Figure 3:
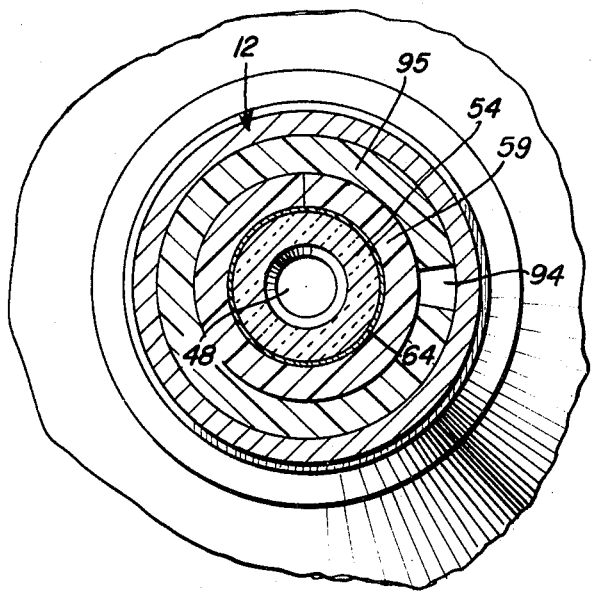
FIGURE 3 is a transverse sectional view taken substantially through a plane indicated by section line 3—3 in FIGURE 1.

Referring now to FIGURE 5, it will be observed that the flow cell unit 10 is optically aligned between a source of radiation 122 and a radiation detector 124 such as a photomultiplier tube device. When utilized in a spectrophotometer or as an infrared monitor of gas, the hose connectors 26 and 30 may be connected to a source of vacuum pressure so as to upwardly withdraw into the unit 10, a sample of test fluid from the sampling tank 32 through the hose connector 28. Once the test fluid completely fills the passage 48 within the unit and the compensating passage 84 so as to cover the entrance portion 78, the suction outlet tubes connected to the hose connectors 26 and 30 may be closed by means of valve devices 34 and 36 for example in order to hold the sample of test fluid within the unit 10. After the test has been completed, the unit 10 may be rinsed with a rinsing medium drawn through the unit in the same fashion as described in connection with the test fluid.

Figure 6:
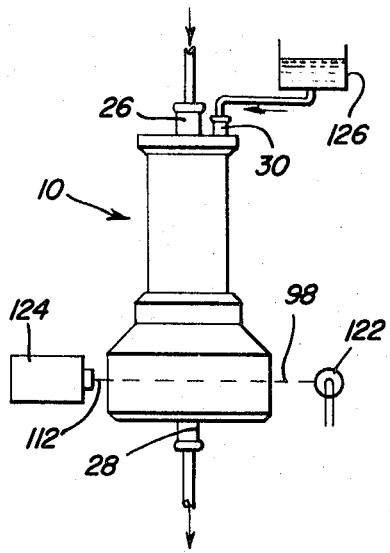
FIGURE 6 is a diagrammatic side elevational view showing the flow cell unit in another operational mode.

The flow cell unit 10 may also be utilized as shown in FIGURE 6 in connection with test procedures associated for example with a fraction collector, or in preparative disc electrophoresis. In such cases, a continuous flow of the test fluid carrying a small quantity of a substance to be detected enters the hose connector 26 at the upper end and exits through the hose connector 28 at the lower end while some of the same fluid is slowly withdrawn from a reservoir 126 into the cell unit through the hose connector 30. The constant diameter of the flow passage 48 and its axial alignment between the inlet and outlet hose connectors 26 and 28 is of considerable importance particularly when the device 10 is being used for continuous monitoring purposes. As a result of the foregoing arrangement turbulence is avoided during flow of the test fluid in order to minimize internal contamination of one fraction sample by another. The elimination of turbulent flow will also make possible more complete rinsing of the device as described in connection with FIGURE 5.

It should be appreciated, that although a separte cell unit construction is illustrated, the optical arrangement enclosed within the cell unit may be housed within supporting structure formed as part of fixtures associated with the testing equipment for any particular installation. Further, the arrangement may be associated with flow control devices mounted and operated in accordance with any particular installational environment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a source of radiation and a radiation detector, a fluid analyzing device optically aligned between said source and said detector for establishing an extended absorptive radiation path passing through a test fluid comprising, a tubular member made of radiation transmissive material having opposite axial end portions and an axial passage through which said test fluid is conducted, reflective means externally coating said tubular member at said axial end portions and between said axial end portions, radiation inlet means mounted on one of said axial end portions of the tubular member for restrictively admitting incident radiation originating from said source, and outlet refraction means mounted at said one of the axial end portions in spaced relation to the radiation inlet means for directing reflected radiation emerging from the tubular member toward the detector.

2. The combination of claim 1 including compensating passage means conducting said test fluid in intersecting relation to the incident radiation entering the radiation inlet means, and inlet refraction means optically disposed between the source and the passage means for directing said incident radiation through the inlet means into the material of the tubular member at said one of the axial end portions to maintain said reflected radiation emerging from the tubular member into the outlet refraction means despite variations in the refractive index of the test fluid and the wavelength of the incident radiation.

3. The combination of claim 2 wherein said inlet and outlet refraction means comprise, prism elements having surfaces with centers of curvature lying on a common axis extending axially through the axial passage of the tubular member.

4. The combination of claim 3 wherein said axial and portions of the tubular member are formed by conical surfaces which converge away from each other toward said common axis.

5. The combination of claim 4 wherein said tubular member includes an intermediate portion integral with said axial end portions, said intermediate portion being diametrically smaller than the end portions to prolong the absorptive radiation path extending through the tubular member between the axial end portions.

6. The combination of claim 1 wherein said inlet and outlet refraction means comprise, prism elements having surfaces with centers of curvature lying on a common axis extending axially through the axial passage of the tubular member.

7. The combination of claim 6 wherein said axial end portions of the tubular member are formed by conical surfaces which converge away from each other toward said common axis.

8. The combination of claim 1 wherein said axial end portions of the tubular member are formed by conical surfaces which converge away from each other.

9. The combination of claim 1 wherein said tubular member includes an intermediate portion integral with said axial end portions, said intermediate portion being diametrically smaller than the end portions to prolong the absorptive radiation path extending through the tubular member between the axial end portions.

10. In combination with a source of radiation and a radiation detector, a fluid analyzing device optically aligned between said source and said detector for establishing an extended absorptive radiation path passing through a test fluid comprising, a tubular member made of radiation transmissive material having opposite axial end portions and an axial passage through which said test fluid is conducted, reflective means externally coating said tubular member at said axial end portions and between said axial end portions, compensating passage means conducting said test fluid in intersecting relation to incident radiation entering the material of the tubular member at one of said axial end portions, said axial end portions being formed by conical surfaces converging at angles to a common axis extending through the axial passage such that all of the incident radiation admitted at said one of the axial end portions emerges as reflected radiation despite variations in the refractive index of the test fluid and the wavelength of the incident radiation.

11. The combination of claim 10 wherein said tubular member includes an intermediate portion integral with said axial end portions, said intermediate portion being diametrically smaller than the end portions to prolong the absorptive radiation path extending through the tubular member between the axial end portions.

References Cited

UNITED STATES PATENTS 2,317,024  4/1943  Bliss _____ 250—218 X

JAMES W. LAWRENCE, *Primary Examiner.*

R. F. HOSSFELD, *Assistant Examiner.*

U.S. Cl. X.R.

88—14